United States Patent
Baligh et al.

(10) Patent No.: US 9,036,663 B2
(45) Date of Patent: May 19, 2015

(54) METHOD AND SYSTEM FOR SPACE CODE TRANSMIT DIVERSITY OF PUCCH

(75) Inventors: Mohammadhadi Baligh, Kanata/Ottawa (CA); Masoud Ebrahimi Tazeh Mahalleh, Ottawa (CA); Jianglei Ma, Kanata (CA); Hua Xu, Nepean (CA); Ming Jia, Ottawa (CA); Amir Khandani, Kitchener (CA)

(73) Assignee: RPX Clearinghouse LLC, San Francisco, CA (US)

( * ) Notice: Subject to any disclaimer, the term of this patent is extended or adjusted under 35 U.S.C. 154(b) by 53 days.

(21) Appl. No.: 13/119,630

(22) PCT Filed: Sep. 18, 2009

(86) PCT No.: PCT/CA2009/001334
§ 371 (c)(1),
(2), (4) Date: Mar. 17, 2011

(87) PCT Pub. No.: WO2010/031189
PCT Pub. Date: Mar. 25, 2010

(65) Prior Publication Data
US 2011/0228728 A1    Sep. 22, 2011

Related U.S. Application Data

(60) Provisional application No. 61/098,994, filed on Sep. 22, 2008, provisional application No. 61/142,260, filed on Jan. 2, 2009.

(51) Int. Cl.
*H04J 13/18* (2011.01)
*H04L 1/06* (2006.01)
(Continued)

(52) U.S. Cl.
CPC ............... *H04J 13/18* (2013.01); *H04L 1/0668* (2013.01); *H04B 7/0669* (2013.01)

(58) Field of Classification Search
None
See application file for complete search history.

(56) References Cited

U.S. PATENT DOCUMENTS

2003/0095499 A1*  5/2003  Kim et al. .................. 370/209
2003/0156627 A1*  8/2003  McDonough et al. ........ 375/147
(Continued)

FOREIGN PATENT DOCUMENTS

CN    1389029 A    1/2003
CN    1720686 A    1/2006
(Continued)

OTHER PUBLICATIONS

International Search Report and Written Opinion for corresponding PCT Patent Application No. PCT/CA2009/001334, Jan. 13, 2010, 14 pages.
(Continued)

*Primary Examiner* — Andrew Chriss
*Assistant Examiner* — Joshua A Kading
(74) *Attorney, Agent, or Firm* — Christopher & Weisberg, P.A.

(57) ABSTRACT

Aspects of the invention are directed to a transmit diversity method for use in a wireless terminal having a plurality of antennas and a wireless terminal configured to implement the method. The transmit diversity method includes using a different orthogonal sequence for each antenna, or group of antennas, for transmitting an uplink control channel from a wireless terminal to a base station. A first step of the method involves assigning at least one orthogonal sequence to one or more of the plurality of antennas, each of the plurality of antennas being assigned at least one orthogonal sequence. Once the orthogonal sequence is assigned, a further step involves scrambling a signal to be transmitted on the physical uplink control channel (PUCCH) using the at least one orthogonal sequence for each antenna thereby producing a scrambled PUCCH for transmission by each antenna. The scrambled PUCCH can then be transmitted on the plurality of antennas.

14 Claims, 8 Drawing Sheets

(51) Int. Cl.
*H04B 7/06* (2006.01)
*H04J 13/00* (2011.01)

(56) References Cited

U.S. PATENT DOCUMENTS

| | | | |
|---|---|---|---|
| 2004/0131007 A1 | 7/2004 | Smee et al. | |
| 2004/0179627 A1 | 9/2004 | Ketchum et al. | |
| 2004/0252667 A1* | 12/2004 | Dent | 370/335 |
| 2005/0219999 A1* | 10/2005 | Kim et al. | 370/207 |
| 2008/0192848 A1* | 8/2008 | Kuo | 375/260 |
| 2009/0046646 A1* | 2/2009 | Cho et al. | 370/329 |
| 2010/0008294 A1* | 1/2010 | Palanki et al. | 370/328 |
| 2010/0046357 A1* | 2/2010 | Sampath et al. | 370/209 |
| 2010/0067472 A1* | 3/2010 | Ball et al. | 370/329 |
| 2011/0170489 A1* | 7/2011 | Han et al. | 370/328 |

FOREIGN PATENT DOCUMENTS

| | | | |
|---|---|---|---|
| CN | 101047990 A | | 10/2007 |
| EP | 1313342 A1 | | 5/2003 |
| EP | 2 398 156 A2 | | 12/2011 |
| JP | 2005-531219 A | | 10/2005 |
| JP | 2009-538064 A | | 10/2009 |
| KR | 2004 0000588 A | | 1/2004 |
| WO | 99/07090 A1 | | 2/1999 |
| WO | 02/17512 A1 | | 2/2002 |
| WO | 02/082687 A1 | | 10/2002 |
| WO | 2004/073224 A1 | | 8/2004 |
| WO | 2007/137201 A2 | | 11/2007 |

OTHER PUBLICATIONS

Nortel, "Transmit diversity for PUCCH in LTE-A", 3GPP Draft, R1-083159, Aug. 12, 2008.

European Search Report issued on Mar. 20, 2013 for corresponding European Patent Application No. 09813951.2, 15 pages.

Chinese Office Action and Search Report including English translation dated May 6, 2013 for Chinese Application Serial No. 200980146406.8, Chinese Filing Date: Sep. 18, 2009 consisting of 25 pages.

Japanese Office Action including English translation dated May 30, 2013 for Japanese Application Serial No. 2011-527169, consisting of 5 pages.

2nd Chinese Examination Report and Search Report in both Chinese and its English translation dated Dec. 19, 2013 for corresponding Chinese National Stage Application Serial No. 200980146406.8, Chinese National Stage Entry Date: Sep. 18, 2009, consisting of 26 pages.

European First Examination Report dated Nov. 15, 2013 for corresponding European Application Serial No. 09813951.2-1855, European Filing Date: Sep. 18, 2009, consisting of 9 pages.

* cited by examiner

METHOD AND SYSTEM FOR SPACE CODE TRANSMIT DIVERSITY OF PUCCH

RELATED APPLICATIONS

This application claims the benefit of and is a National Phase Entry of International Application Number PCT/CA2009/001334 filed Sep. 18, 2009, and claims the benefit of U.S. Provisional Patent Application Nos. 61/098,994 filed on Sep. 22, 2008 and 61/142,260 filed Jan. 2, 2009, which are hereby incorporated by reference in their entirety.

FIELD OF THE INVENTION

This application relates to wireless communication techniques in general, and to a transmit diversity scheme, in particular.

BACKGROUND OF THE INVENTION

Typically, orthogonal frequency division multiplexing (OFDM) systems suffer from peak to average power ratio (PAPR) problems. Due to cost and physical size limitations of user equipments (UE), examples of which are devices such as wireless cellular telephones or wireless enabled computers and PDAs, PAPR is a bigger problem in uplink (UL) transmission, in the direction from the UE to a base station, than downlink (DL) transmission, in the direction from the base station to the UE.

A solution that has been proposed for a current single antenna LTE standard is that the input sequence of an inverse discrete fourier transform (IDFT) is made such that the output PAPR is low. For example, for a physical uplink shared channel (PUCCH), data is discrete fourier transform (DFT) pre-coded before OFDM. Such a process is known as single carrier frequency division multiple access (SC-FDMA). For the physical uplink control channel (PUCCH) in a single antenna UE, a low PAPR orthogonal sequence (OS) may be used to spread the data across a given frequency band.

In some communication systems, such as for example, Long Term Evolution-Advanced (LTE-A) and Advanced Evolved UMTS Terrestrial Radio Access (A E-UTRA), UEs may be equipped with more than one antenna to enable higher peak data rates with more link reliability. In some cases the UE's multiple antennas may be used to provide open-loop transmit diversity (OLTD).

Some coding scheme candidates for using OLTD in the DL direction include: Space Time Block Coding (STBC); Space Frequency Block Coding (SFBC); Cyclic Delay Diversity (CDD); Pre-coding Vector Switching (PVS); and Radio Frequency Combining (RFC).

The various candidate schemes for DL each have their positive and negative qualities. STBC preserves the low PAPR property, but requires an even number of OFDM symbols per subframe. SFBC may increase the PAPR, but works for any number of OFDM symbols per subframe. CDD preserves the low PAPR property and works for any number of symbols per slot, but the performance is not as good as STBC and SFBC. PVS periodically uses some precoders using a known sequence for both the transmitter and receiver. RFC combines RF waves for data and reference symbols using a blind precoder at the receiver. The last two schemes suffer from poor performance in spatially correlated channels.

As discussed above, some of the candidate schemes for DL may not enable a low PAPR property. As such, the current schemes for DL may not be appropriate solutions for reliable UL transmissions.

When channel estimation is code division multiplex (CDM) based, such as the case for PUCCH, adding more antennas at the transmitter may also result in reconsideration of how channel estimation is to be performed.

SUMMARY OF THE INVENTION

According to a first aspect of the invention, there is provided a method for use in a wireless terminal having a plurality of antennas comprising: assigning at least one orthogonal sequence to one or more of the plurality of antennas, each of the plurality of antennas being assigned at least one orthogonal sequence; scrambling a signal to be transmitted on the physical uplink control channel (PUCCH) using the at least one orthogonal sequence for each antenna thereby producing a scrambled PUCCH for transmission by each antenna; transmitting the scrambled PUCCH on the plurality of antennas.

In some embodiments, the orthogonal sequence used to scramble the signal to be transmitted on the PUCCH is different for each antenna.

In some embodiments, the orthogonal sequence used to scramble the signal to be transmitted on the PUCCH is the same for all antennas.

In some embodiments, the method further comprises receiving higher layer signalling for configuring which orthogonal sequences the wireless terminal is to use.

In some embodiments, the method further comprises, when more than one orthogonal sequence is assigned to the wireless terminal: receiving a single orthogonal sequence index for one of the more than one orthogonal sequence to configure a first orthogonal sequence that the wireless terminal is to use; determining indices of the remaining more than one orthogonal sequence as a function of the single orthogonal sequence index.

In some embodiments, the method further comprises, when more than one orthogonal sequence is assigned to the wireless terminal: receiving an orthogonal sequence index for each orthogonal sequence that the wireless terminal is to use.

In some embodiments, for a given wireless terminal, a same number of orthogonal sequences are used to scramble a reference signal (RS) as are used to scramble the PUCCH.

In some embodiments, the wireless terminal is serviced by a network configured to support wireless terminals comprising two or more antennas that can perform uplink signalling simultaneously.

In some embodiments, the network is an LTE-A network.

In some embodiments, assigning at least one orthogonal sequence to one or more of the plurality of antennas, each of the plurality of antennas being assigned at least one orthogonal sequence comprises: assigning the at least one orthogonal sequence base on at least one of: PUCCH format 1/1a/1b; and PUCCH format 2/2a/2b.

According to a second aspect of the invention, there is provided a wireless terminal comprising: a plurality of antennas; a receiver coupled to at least one receive antenna of the plurality of antennas; a transmitter coupled to at least one transmit antenna of the plurality of antenna; an uplink transmit controller; the uplink transmit controller configured to: assign at least one orthogonal sequence to a physical uplink control channel (PUCCH) to be transmit on the at least one transmit antenna; scramble the PUCCH using one or more of the at least one orthogonal sequence to be transmitted by the transmitter thereby producing a scrambled PUCCH for each of the at least one transmit antenna; the transmitter configured to transmit the scrambled PUCCH on the at least one transmit antenna.

In some embodiments, the orthogonal sequence used to scramble the PUCCH is different for each at least one transmit antenna.

In some embodiments, the orthogonal sequence used to scramble the PUCCH is the same for all transmit antennas.

In some embodiments, the wireless terminal further comprises the receiver receiving higher layer signalling for configuring which orthogonal sequences the wireless terminal is to use.

In some embodiments, the wireless terminal further comprises, when more than one orthogonal sequence is assigned to the wireless terminal: the receiver configured to receive a single orthogonal sequence index for one of the more than one orthogonal sequence to configure a first orthogonal sequence that the wireless terminal is to use; determining orthogonal sequence indices of the remaining more than one orthogonal sequence as a function of the single orthogonal sequence index.

In some embodiments, the wireless terminal further comprises, when more than one orthogonal sequence is assigned to the wireless terminal: the receiver configured to receive an orthogonal sequence index for each orthogonal sequence that the wireless terminal is to use.

In some embodiments, the plurality of antennas is equal to a multiple of two antennas.

In some embodiments, the number of transmit antennas is equal to the number of receive antennas, which is equal to the total number of the plurality of antennas.

In some embodiments, the wireless terminal is serviced by a network configured to support wireless terminals comprising two or more antennas that can perform uplink signalling simultaneously.

In some embodiments, the network is an LTE-A network.

According to a third aspect of the invention, there is provided a method for use in a base station for configuring a multi-antenna wireless terminal that the base station supports, the method comprising: assigning at least one orthogonal sequence to be used by one or more of a plurality of antennas of the multi-antenna wireless terminal, such that each of the plurality of antennas will be assigned at least one orthogonal sequence; if a wireless terminal is to be assigned multiple orthogonal sequences, but be assigned by sending a single orthogonal sequence indicator: defining a relation between the multiple orthogonal sequences; transmitting a single orthogonal sequence indicator for one of the multiple orthogonal sequences to configure a first orthogonal sequence that the wireless terminal is to use; if a wireless terminal is to be assigned multiple orthogonal sequences, but be assigned by sending indicators identifying each orthogonal sequence: transmitting an orthogonal sequence indicator for each orthogonal sequence that the wireless terminal is to use.

According to a fourth aspect of the invention, there is provided a method in base station for receiving a signal from a multi-antenna wireless terminal that the base station supports, the method comprising: receiving two or more signals from each of separate transmit antennas of the multi-antenna wireless terminal, each of the two or more signals comprising a signal that has been transmitted on a physical uplink control channel (PUCCH) that is encoded using an orthogonal sequence; performing channel estimation; combining the two or more signals thereby producing a combined signal; decoding the signal transmitted on the PUCCH.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

Aspects of this invention are directed to using Open-Loop Transmit signalling for UL transmission for UEs having two or more antennas. In some embodiments, a new diversity scheme, space code transmit diversity (SCTD), is utilized for transmission of an UL control channel. A particular communication system that the diversity scheme can be used for is LTE-Advanced (LTE-A). In LTE-A, the diversity scheme can be applied to the physical uplink control channel (PUCCH). More generally, the diversity scheme is not intended to be limited to only LTE-A, but could be used for other types of communication systems, in particular communication schemes using orthogonal code schemes such as CDM (code division multiplexing) based schemes, for encoding UL transmissions for simultaneously transmission on two or more antennas.

In some implementations, for UEs with uplink coverage issues, which may be related to the PAPR, and that are capable of multiple input multiple output (MIMO) transmission, more than one code sequence is assigned to the UE. The UE then uses the more than one assigned code sequence to encode PUCCH information on multiple antennas separately. Orthogonality between sequences provides a largest possible diversity gain. In this way the PUCCH information provides transmission diversity without radically changing existing PUCCH design that is used for single antenna UEs.

In some implementations the transmit diversity scheme enables increased UL PUCCH coverage, which in turn may enable increased cell sizes and also may increase system reliability. In some embodiments, the transmit diversity scheme is substantially consistent with current single antenna LTE PUCCH design, while improving the PUCCH coverage with the help of transmit diversity.

Figure 1:
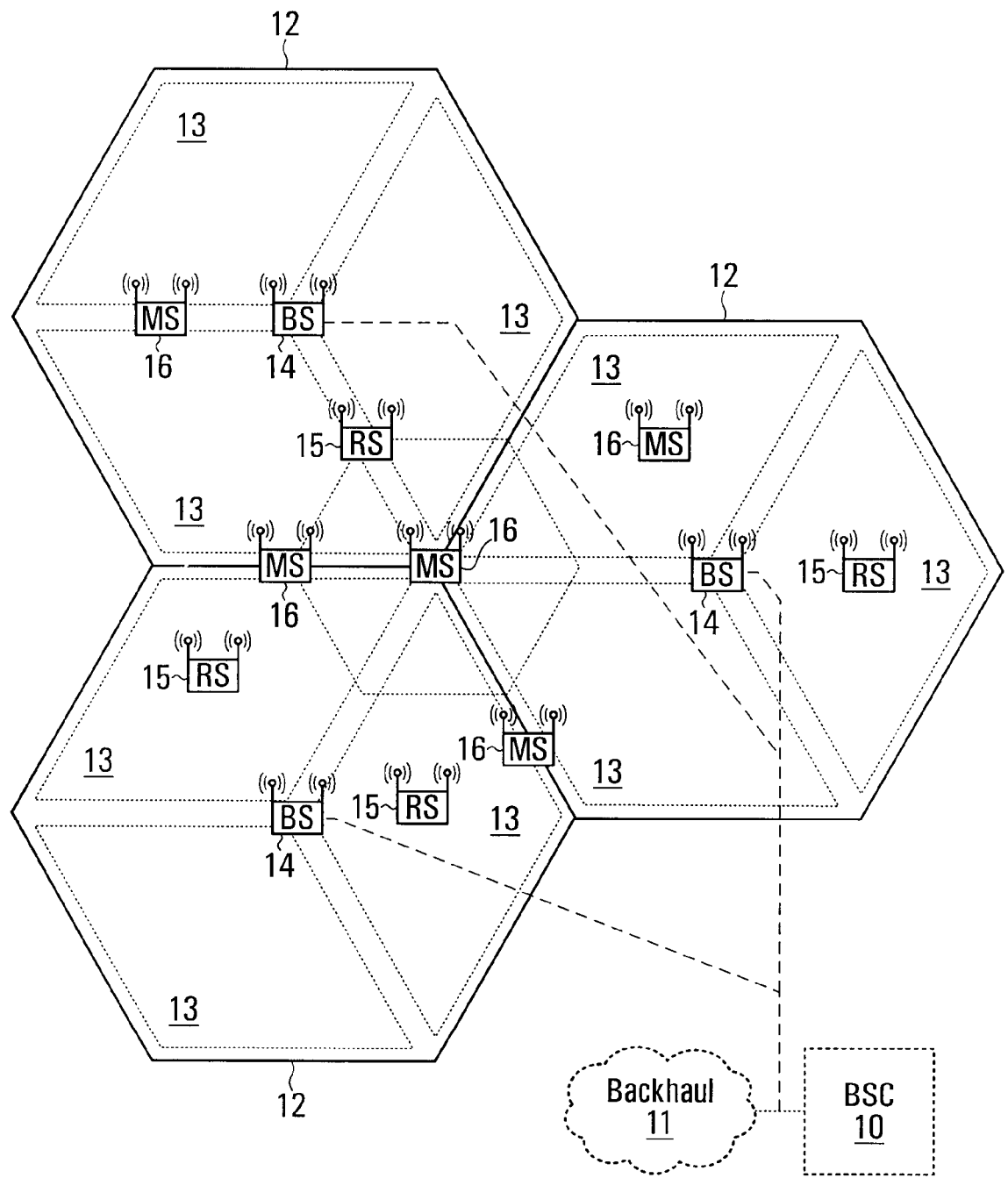
FIG. 1 is a block diagram of a cellular communication system.

Referring to the drawings, FIG. 1 illustrates a network on which aspects of the invention may be supported. FIG. 1 shows a base station controller (BSC) 10 which controls wireless communications within multiple cells 12, which cells are served by corresponding base stations (BS) 14. In an LTE system the base stations may be referred to as eNB. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The mobile and/or wireless terminals may also be referred to herein as user equipment (UE). The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the Internet, both not shown) over a backhaul network 11. In some configurations, a base station controller 10 is not needed.

Figure 2:
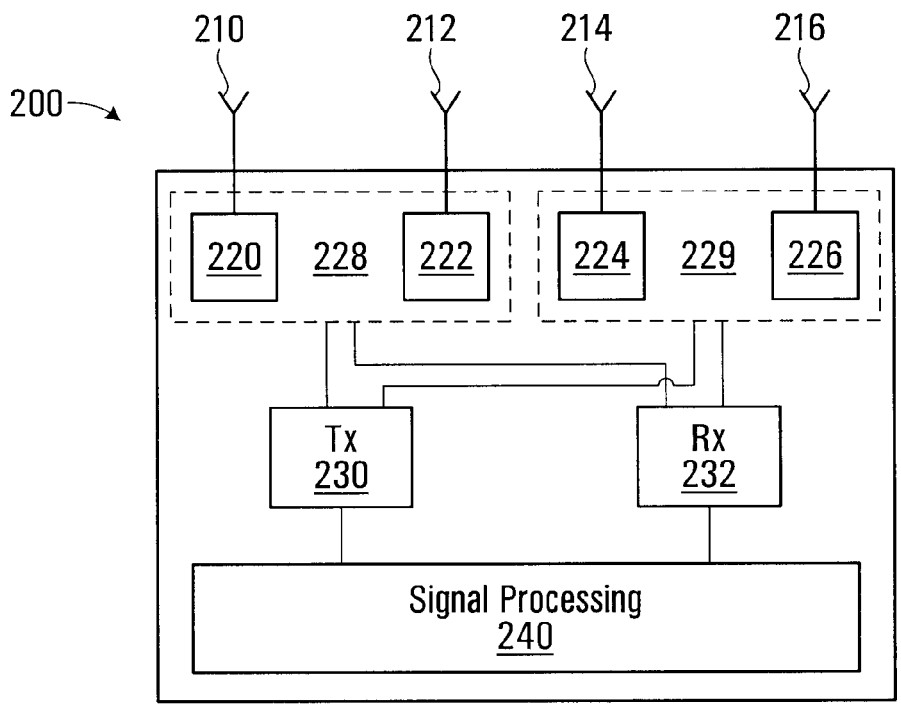
FIG. 2 is a block diagram of an example of a wireless terminal in which some embodiments of the present invention may be implemented.

FIG. 2 illustrates a basic example of a UE having multiple antennas. The UE 200 is shown to have four antennas 210, 212,214,216. Each antenna is coupled to a respective antenna port 220,222,224,226 in the UE 200. In some embodiments, the antenna ports used by the UE are virtual antenna ports. In the example of FIG. 2 antennas 210 and 212 are coupled to antenna ports 220 and 222 and these two ports are considered a first virtual port 228. Antennas 214 and 216 are coupled to antenna ports 224 and 226 and these two ports are considered a second virtual port 229. The virtual antenna ports 228 and 229 are coupled to a transmitter 230 and a receiver 232 such that the transmitter 230 can transmit on any number of the four antennas and signals can be received by the receiver 232 on one or more of the four antennas. In a physical implementation the transmitter 230 and receiver 232 may be coupled to each of the four antenna ports. The transmitter 230 and receiver 232 are each coupled to a block in FIG. 2 designated as signal processing 240. This signal processing block includes all the software/hardware used to encode, modulate and/or scramble the signals to be transmitted by the UE or received by the UE.

Encoding of the PUCCH, once the orthogonal sequences are assigned for given antennas may occur in the signal processing block 240 or the transmitter 230. Contents of the signal processing block 240 and/or the transmitter 230 may include components described in further detail below in FIGS. 9 and 12.

In the example of FIG. 2 the UE is shown to have 4 antennas, however this is not intended to limit the scope of the invention to that particular embodiment. More generally, the number of antenna that the UE has is implementation specific.

In some embodiments, the number of antennas is equal to two antennas. In some embodiments, the number of antennas is equal to a multiple of two antennas.

In some embodiments, the number of antenna ports and number of orthogonal sequences used by the UE may be less than or equal to the number of transmit antennas of the UE. For example in FIG. 2, there are two virtual antenna ports 228 and 229 and four transmit antennas. In some embodiments, the number of orthogonal sequences assigned to the UE may be less than or equal to the number of UE physical antenna ports. For example, in some implementations, a single orthogonal sequence may be assigned to all of the antenna ports when there is no UL coverage issue and therefore transmit diversity is not needed to overcome the UL coverage issue, but multiple antennas are still used for transmitting from the UE. More generally, the orthogonal sequences may be said to be assigned to physical antennas as opposed to antenna ports. How the orthogonal sequences are assigned to the antennas or antenna ports is transparent to the base station that receives the signalling transmitted by the antennas.

In the context of an LTE communication system, for a UE having a single antenna, the RS and data being transmitted by the UE are each multiplied by an orthogonal sequence. Different users are assigned different orthogonal sequences, but each UE is only assigned one orthogonal sequence. Only a single encoded RS is needed for channel estimation because the UE has only a single antenna and thus only a single channel for communicating.

In the context of an LTE-A system, for a UE having more than one antenna, in current PUCCH design, other than the RFC scheme and short CDD scheme, the UE is assigned an orthogonal sequence for each RS so that channel estimation can be performed for each channel. By using the same number of orthogonal sequences and the same number of antenna ports for data, such as for example PUCCH signaling, as are used for the RS it may be possible to improve UL coverage for UEs that may otherwise have UL coverage issues.

In such a multiple antenna UE scenario it can be considered that each antenna of the UE is analogous to a different user. However, there are a limited number of orthogonal sequences available for being assigned to UEs. If there are a finite number of orthogonal sequences that can be assigned and UEs can be assigned multiple orthogonal sequences, the number of UEs that can be supported is consequently reduced. For example, in a situation where there are 12 orthogonal sequences available, these 12 orthogonal sequences could support 12 single antenna UEs each assigned a single orthogonal sequence, 6 two antenna UEs each assigned two orthogonal sequences, 3 four antenna UEs each assigned three orthogonal sequences, or some combination thereof. The number of orthogonal sequences that can be assigned to individual UEs in a cell, the number of UEs supported in a cell, the maximum number of orthogonal sequences that can be assigned to a UE, and whether a different number of orthogonal sequences can be assigned to UEs in a cell are all examples of implementation specific variables in a communication system.

Figure 3:
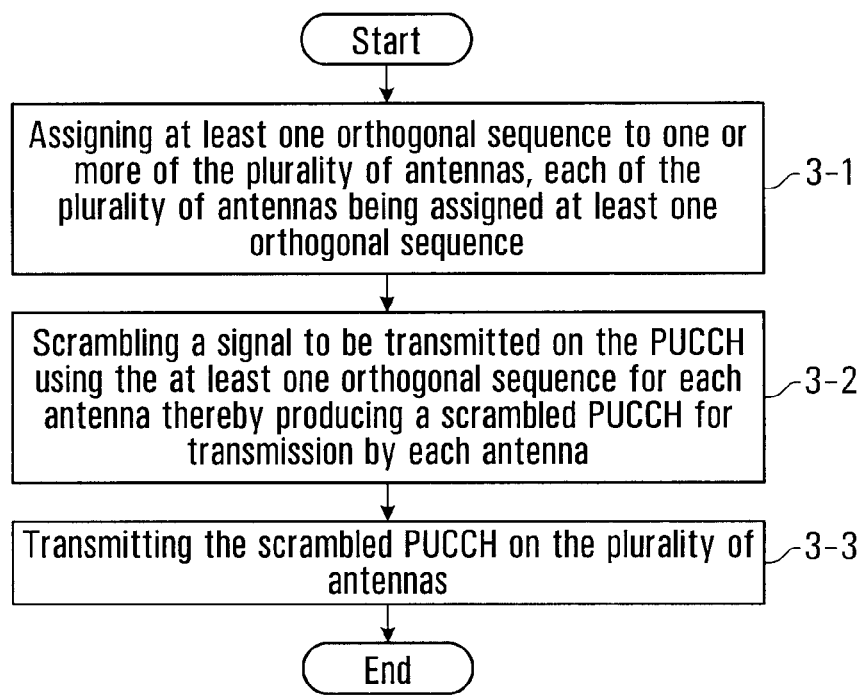
FIG. 3 is a flow chart illustrating an example of a method of a wireless device using a transmit diversity scheme according to an aspect of the invention.

Referring to FIG. 3, an example of a method of implementing the transmit diversity scheme for a wireless terminal having a plurality of antennas will now be described. A first step 3-1 in the method involves assigning at least one orthogonal sequence to one or more of the plurality of antennas. Each of the plurality of antennas is assigned at least one orthogonal sequence. Assigning at least one orthogonal sequence to one or more of the plurality of antennas may include, but is not limited to the following: each antenna assigned a different orthogonal sequence from the other antennas, a group of antennas assigned a different orthogonal sequence from other groups of antennas (this may be, for example, as a result of a virtual antenna port coupled to multiple physical antennas), and all antennas assigned the same orthogonal sequence.

A second step 3-2 involves scrambling a signal to be transmitted on the physical uplink control channel (PUCCH) using one of the at least one orthogonal sequence for each antenna thereby producing a scrambled PUCCH for transmission by each antenna.

A third step 3-3 involves transmitting the scrambled PUCCH on the plurality of antennas.

In some embodiments, a reference signal (RS) transmitted on a given antenna may be scrambled using a same orthogonal sequence as that used for the given antenna.

In some embodiments, different orthogonal sequences are assigned to different transmit antenna ports for the same UE. When different orthogonal sequences are assigned to different transmit antennas or antenna ports, the PUCCH signalling transmitted from the different antenna ports is the same, but the signalling is scrambled by the different orthogonal sequences resulting in transmit diversity for the PUCCH.

A wireless terminal configured to implement the transmit diversity scheme may include a plurality of antennas, a receiver coupled to at least one receive antenna of the plurality of antennas, a transmitter coupled to at least one transmit antenna of the plurality of antenna and an uplink transmit controller. The uplink transmit controller is so named for description purposes to be any software, hardware or combination thereof configured to receive configuration information regarding which orthogonal sequences are to be used by the wireless terminal for transmitting the PUCCH according to the transmit diversity scheme described herein. The uplink transmit controller is configured to assign at least one orthogonal sequence to a physical uplink control channel (PUCCH) that is to be transmitted on the at least one transmit antenna. The PUCCH is then scrambled using one or more of the at least one orthogonal sequence to be transmitted by the transmitter thereby producing a scrambled PUCCH for each of the at least one transmit antenna. The transmitter is configured to transmit the scrambled PUCCH on the at least one transmit antenna.

A base station receives the PUCCH transmitted by the UE using the transmit diversity scheme. The base station is configured to combine the signals received from two or more of the transmit antenna ports of the transmitting UE. An example of how the signals may be combined is maximum ratio combining (MRC). When more than one UE is communicating with the base station the base station combines the signals for each respective UE. The base station is further configured to conduct channel estimation, for example using the encoded RS signalling. Once channel estimation has been performed the base station can decode the PUCCH.

Figure 4:
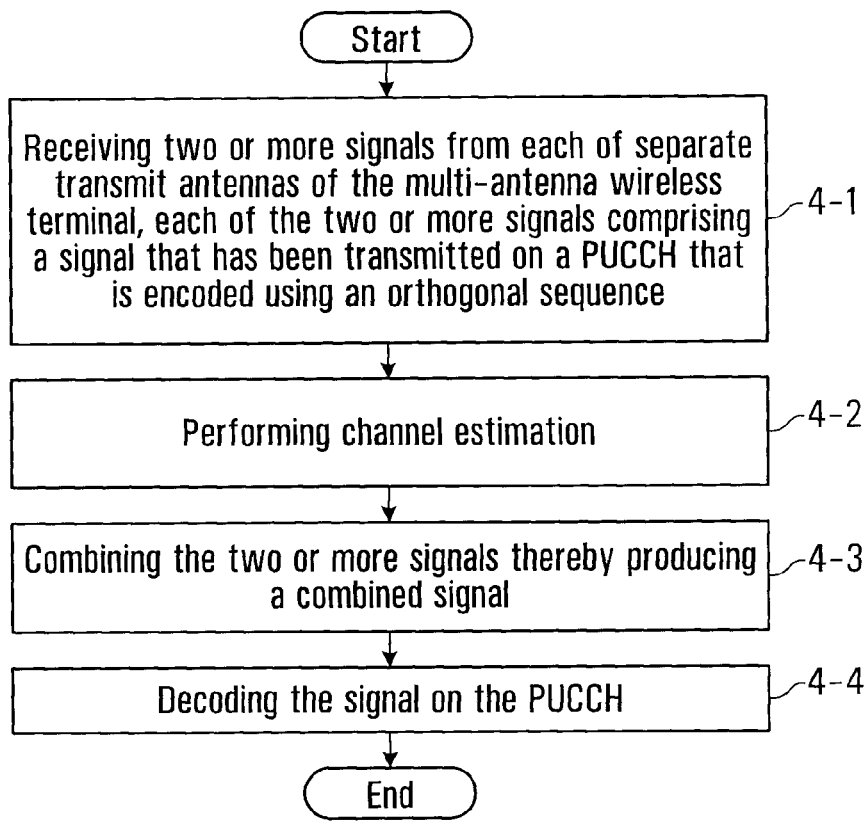
FIG. 4 is a flow chart illustrating an example of a method of receiving a signal from a multi-antenna wireless terminal that a base station supports according to an aspect of the invention.

Referring to FIG. 4, an example of a method of receiving a signal from a multi-antenna wireless terminal that a base station supports, from the perspective of the base station involves a first step 4-1 of receiving two or more signals from each of separate transmit antennas of the multi-antenna wireless terminal, each of the two or more signals comprising a signal that has been transmitted on a physical uplink control channel (PUCCH) that is encoded using one of at least one orthogonal sequence. A second step 4-2 involves performing channel estimation. A third step 4-3 involves combining the two or more received signals at least in part based on the channel estimation, thereby producing a combined signal. A fourth step 4-4 involves decoding the signal transmitted on the PUCCH.

In some implementations, channel estimation overhead for this transmit diversity scheme is similar to channel estimation overhead for other transmit diversity schemes. For example the overhead may be similar to that of STBC and/or CDD.

In a communication system that supports the transmit diversity scheme, the UE may be configured to implement the transmit diversity scheme by higher-layer signalling. In some embodiments the configuration for a given UE may be determined based on statistical properties, such as, but not limited to, mobility and location properties, of the UE or the statistical properties of the channel between the UE and base station. In some embodiments, the base station configures the UE through higher-layer signaling as a result of the statistical analysis determining that the UE has a PUCCH coverage issue, which can be improved or at least to some degree mitigated, in response to using the transmit diversity scheme.

In some embodiments, if it is determined that there is a PUCCH coverage issue or the potential for a PUCCH coverage issue, the UE is configured to use the transmit diversity scheme, which may improve its PUCCH coverage.

If it is determined that there is no PUCCH coverage issue or the potential for a PUCCH coverage issue is low, the diversity scheme can still be used. If there is no coverage issue and the transmit diversity scheme is used, a potential benefit of the transmit diversity scheme is saving power at the UE and minimizing interference with other UEs. If there is no coverage issue and the transmit diversity scheme is not used, there are additional orthogonal sequences available for use by other UEs. For example, even if the UE does not have a PUCCH coverage issue, the UE could be configured to use a single orthogonal sequence for multiple different antenna ports. This enables additional sequences for use by other UEs, and may also minimize interference with other UEs.

When the UE is being configured to implement the transmit diversity scheme there are multiple methods that can be used for signalling the orthogonal sequences to be used by each UE that is supported. Some methods do not use additional overhead as compared to existing methods for a single antenna UL transmit diversity scheme and some methods may utilize additional overhead to accommodate signalling that explicitly defines the use of multiple orthogonal sequences.

In a first example method, a first step involves defining a relation among the orthogonal sequences that are available for use. For example, if the orthogonal sequences are each assigned an index value, particular orthogonal sequences, and thus their associated indices may be defined as being related. The base station and UE are aware of the defined relation between the orthogonal sequences or are made aware of the relation. Since the code sequences are related in a predefined manner, a further step involves identifying only one sequence index to the UE. The UE can then derive indices of the rest of the sequences that are being assigned to the UE based on the predefined relation between the code sequences. In this first method, since only a single index value is used to identify multiple orthogonal sequences, the method may not utilize any more overhead than would be used to configure a single antenna UE which only requires identification of a single orthogonal sequence or orthogonal sequence index.

Figure 5:
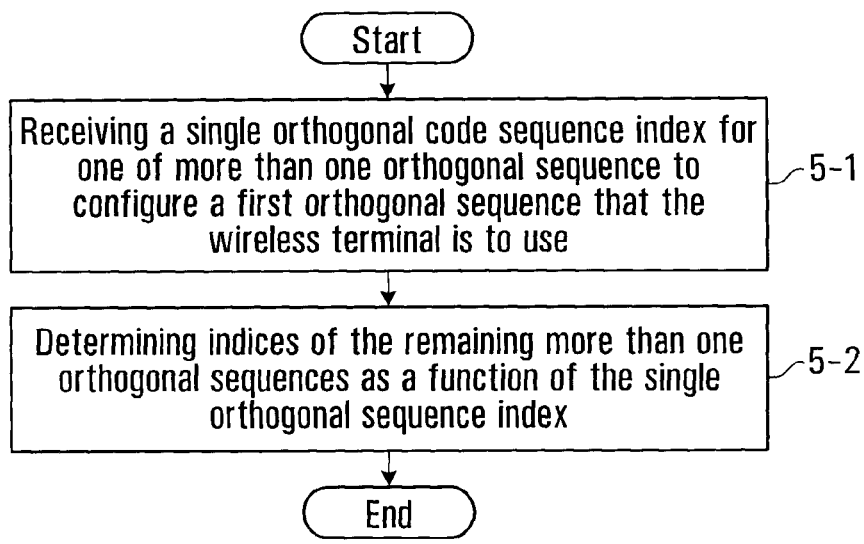
FIG. 5 is a flow chart illustrating an example of a method for configuring a wireless terminal, from the perspective of the wireless terminal, according to an aspect of the invention.

Referring to FIG. 5, an example of a method for configuring the UE, from the perspective of the UE involves a first step 5-1 of receiving a single orthogonal sequence index for one of the more than one orthogonal sequence to configure a first orthogonal sequence that the wireless terminal is to use.

A second step 5-2 involves determining indices of the remaining more than one orthogonal sequence as a function of the single orthogonal sequence index. Determining indices for remaining orthogonal sequences as a function of the single orthogonal sequence index may include using a known predefined relation between the orthogonal sequences.

In a second example method, the orthogonal sequences are each explicitly identified to the UE. For example, referring back to the process of using orthogonal sequence indices discussed above, the indices of all sequences assigned to a UE are explicitly signaled to the UE. This method may utilize additional bandwidth for identifying the orthogonal sequences, as compared to the single antenna UE scenario.

Figure 6:
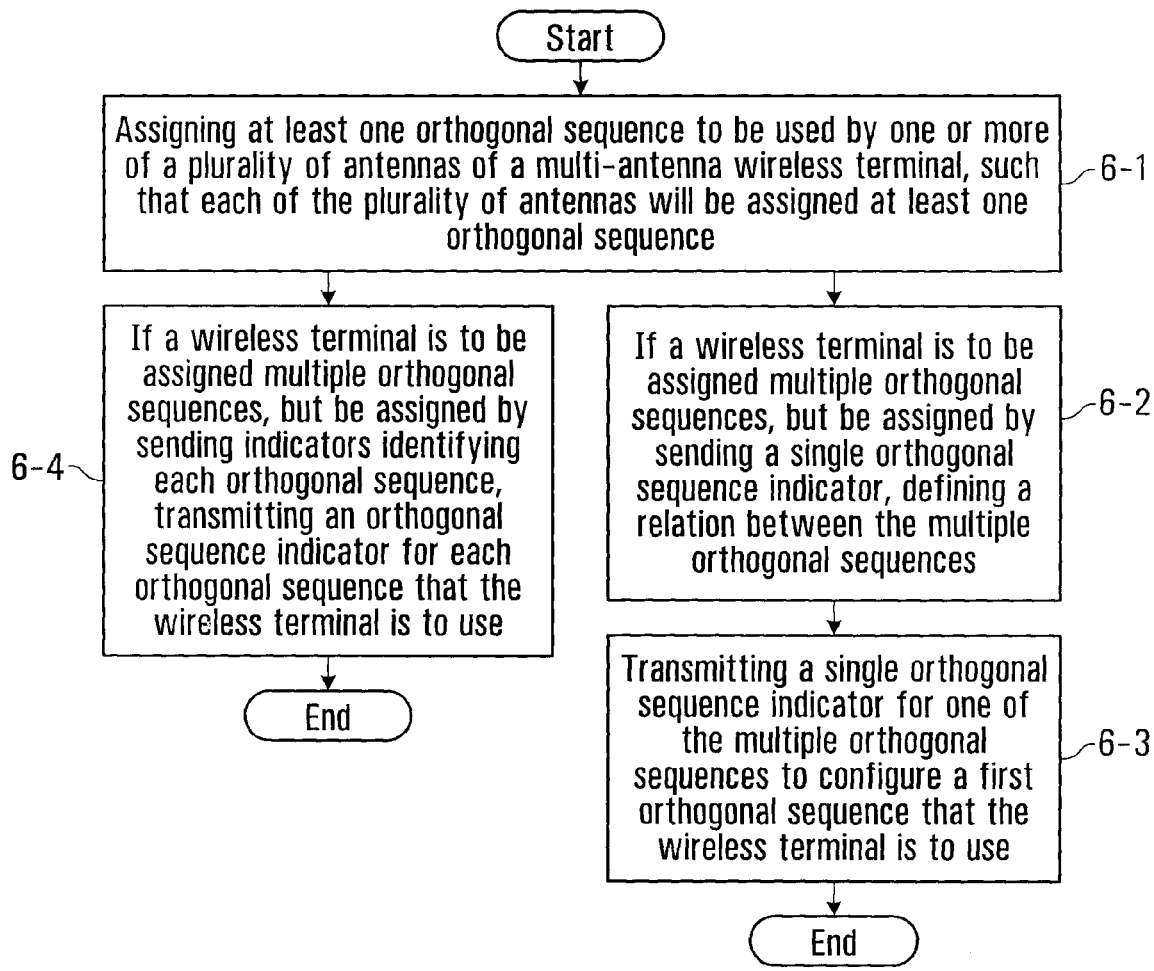
FIG. 6 is a flow chart illustrating an example of a method for configuring a wireless terminal, from the perspective of the base station, according to an aspect of the invention.

Referring to FIG. 6, an example of a method for configuring the UE, from the perspective of the base station involves a first step 6-1 of assigning at least one orthogonal sequence to be used by one or more of a plurality of antennas of the multi-antenna wireless terminal, such that each of the plurality of antennas will be assigned at least one orthogonal sequence. A second step 6-2 involves, if a UE is to be assigned multiple orthogonal sequences, but only a single orthogonal sequence indicator is to be sent to the UE, defining a relation between the multiple orthogonal sequences. A third step 6-3 involves transmitting a single orthogonal sequence indicator for one of the multiple orthogonal sequences to configure a first orthogonal sequence that the wireless terminal is to use. A fourth step 6-4 involves, if a wireless terminal is to be assigned multiple orthogonal sequences in which indicators identifying each orthogonal sequence are to be transmitted, transmitting an orthogonal sequence indicator for each orthogonal sequence that the wireless terminal is to use.

While orthogonal sequence indices are a particular method of identifying orthogonal sequences described in the examples above, this is merely used by way of example, and is not intended to limit the scope of the invention. It is to be understood that other ways of identifying orthogonal sequences to be used for the transmit diversity scheme may be utilized.

In some implementations, the PUCCH format used for the PUCCH is 1/1a/1b. In some implementations, the PUCCH format used for the PUCCH is 2/2a/2b.

In PUCCH format 1/1a/1b, the code sequences must be selected in a manner to ensure that the sequences are orthogonal. For example, in format 1/1a/1b the sequences are comprised of cyclic shift (CS) components and orthogonal covering (OC) components. For format 1/1a/1b, the orthogonal sequences are generated using at least one CS component and at least one OC component. Care must be taken when selecting the combination of the two components to ensure that the generated sequences are orthogonal. In PUCCH format 2/2a/2b, the sequences are comprised of cyclic components and as a result are all orthogonal.

The table below define parameters for a simulation of using the above described transit diversity scheme for PUCCH signalling as compared to three other schemes that could be used for PUCCH signalling. Table 1 defines parameters pertaining to the channel bandwidth, number of total subcarriers, size of a subframe, FFT size, the sampling frequency, the size of the cyclic prefix, the carrier frequency, the data resource assignment, the type of channel estimate (realistic as opposed to ideal), the type of symbol constellation, the type of channel coding for PUCCH, the channel characteristics and the type of MIMO configuration.

TABLE 1

| Parameters pertaining to Simulated Signal | |
| --- | --- |
| Channel bandwidth | 10 MHz |
| Number of total sub-carriers | 601 (including DC) |

TABLE 1-continued

| Parameters pertaining to Simulated Signal | |
| --- | --- |
| Subframe | 1 msec = 14 OFDM symbols |
| FFT size | 1024 |
| Sampling frequency | 15.36 MHz |
| Cyclic Prefix | 72 Samples |
| Carrier frequency | 2 GHz |
| Data Resource Assignment | 1 resource block (RB) |
| Channel estimation | Realistic |
| Symbol constellation | QPSK |
| Channel coding for PUCCH | Linear Block Code 4/20 |
| Channel | ITU PB for 3 kph |
|  | ITU VA for 120 kph, and 350 kph |
| MIMO Configuration | 2x2 Uncorrelated |

Figure 7A:
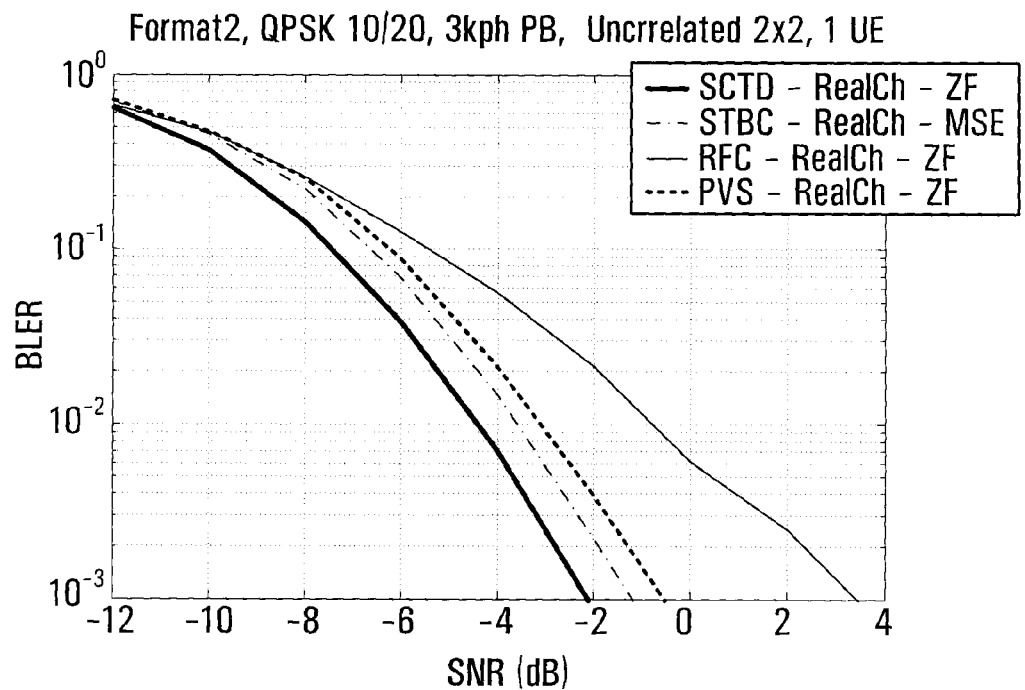
FIGS. 7a and 7b are a graphical plots of simulated implementations of the transmit diversity scheme of the present invention compared to other transmit diversity schemes.

FIG. 7a is a graphical plot of a simulation for a single UE using the transmit diversity scheme described above, in comparison with STBC, RFC and PVS, for the conditions defined in Table 1. The vertical axis is a representation of block error rate (BLER) and the scale ranges from $10^{-3}$ to $10^0$. The horizontal axis is a representation of signal-to-noise ratio (SNR) and the scale ranges from −12 dB to 4 dB. In the simulation, the receiver for the space code transmit diversity scheme was simulated to be a zero forcing (ZF) receiver, the receiver for the STBC scheme was simulated to be a minimum mean squared error (MMSE) receiver, the receiver for the RFC scheme was simulated to be a zero forcing receiver and the receiver for the PVS scheme was simulated to be a zero forcing receiver. It can be seen in FIG. 4a that while the four transmit diversity schemes have a similar BLER at −12 dB, as the SNR improves, the space code transmit diversity scheme has the best BLER.

Figure 7B:
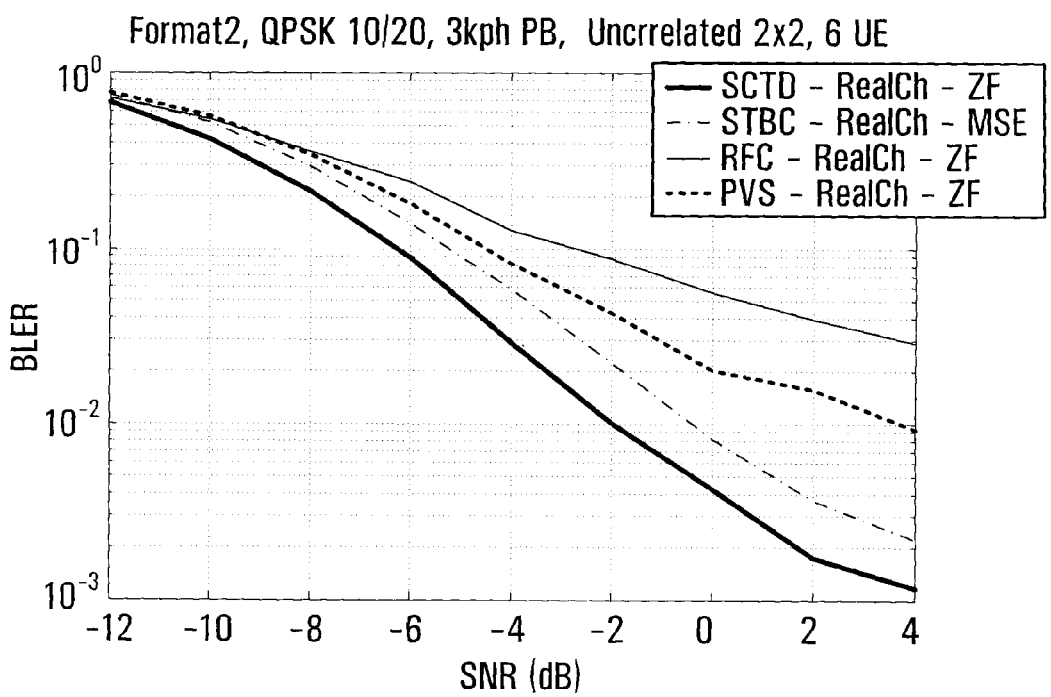

FIG. 7b is a graphical plot of a simulation for six UE using the transmit diversity scheme described above, in comparison with STBC, RFC and PVS, for the conditions defined in Table 1. The vertical and horizontal axes are the same as FIG. 7a. It can be seen in FIG. 7b that even for greater than a single UE, as the SNR improves, the space code transmit diversity scheme has the best BLER.

Wireless System Overview

Figure 8:
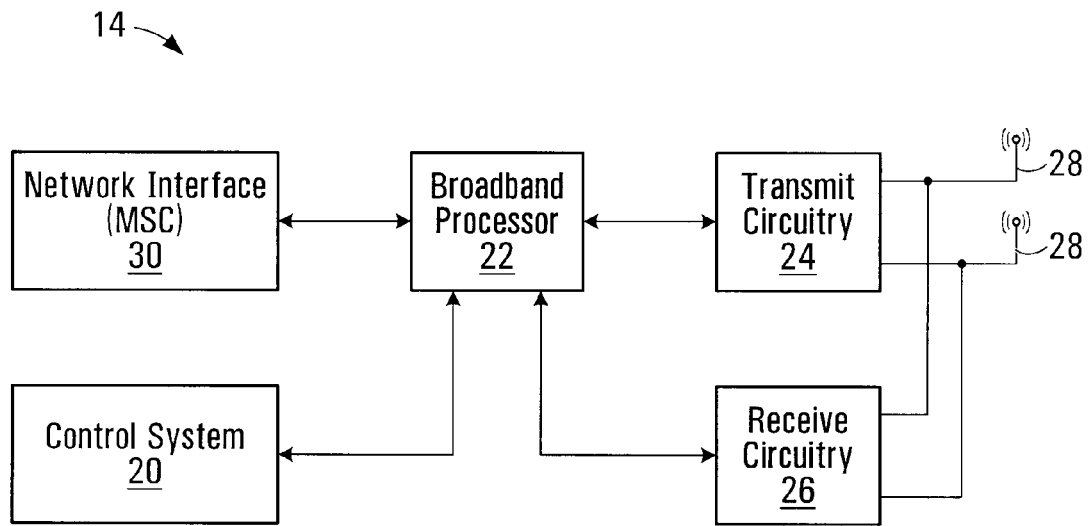
FIG. 8 is a block diagram of an example base station that might be used to implement some embodiments of the present application.

With reference to FIG. 8, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 9) and relay stations 15 (illustrated in FIG. 10). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 9:
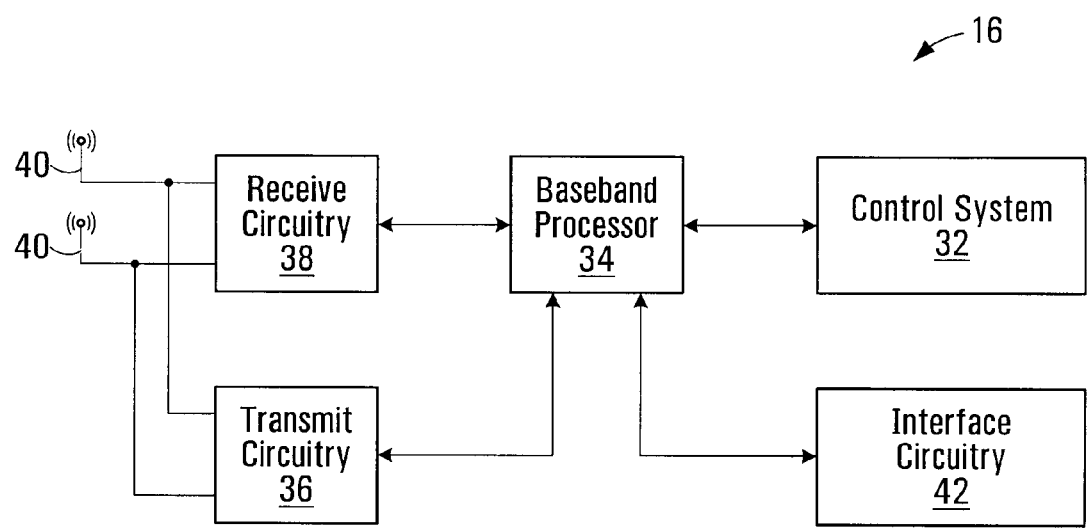
FIG. 9 is a block diagram of an example wireless terminal that might be used to implement some embodiments of the present application.

With reference to FIG. 9, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 10:
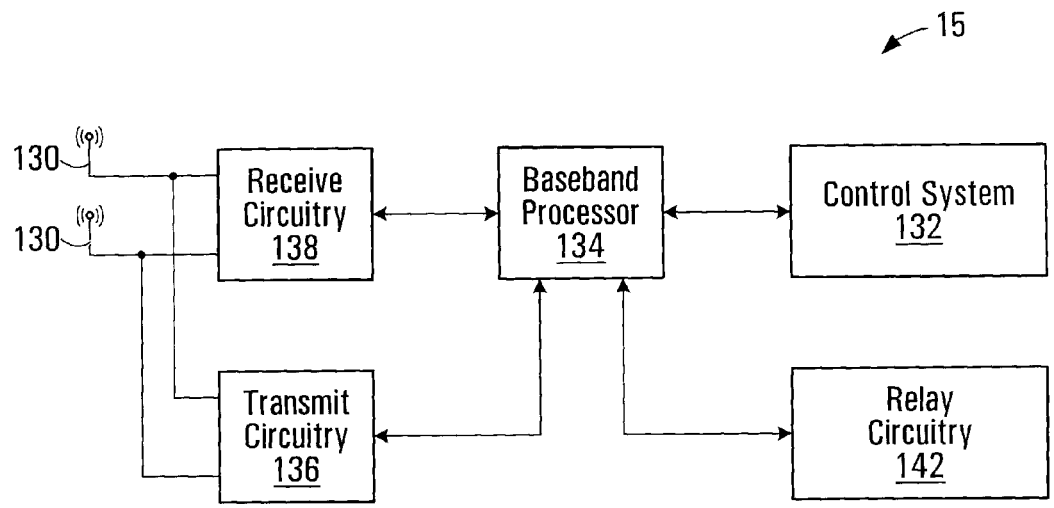
FIG. 10 is a block diagram of an example relay station that might be used to implement some embodiments of the present application.

With reference to FIG. 10, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 11:
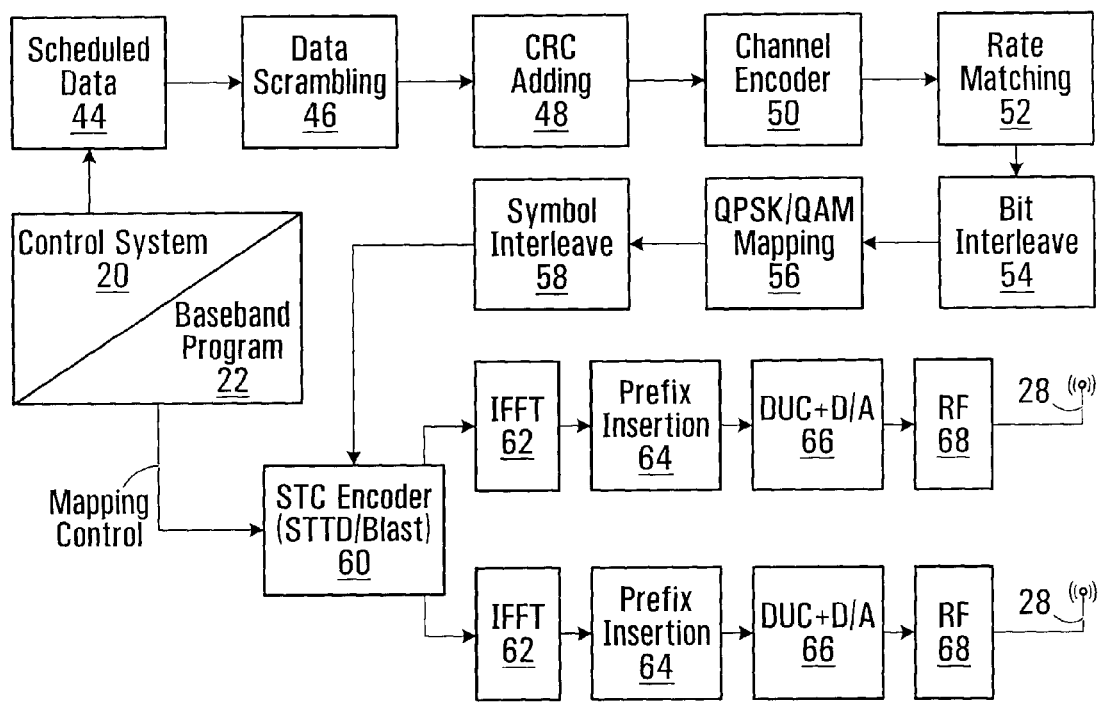
FIG. 11 is a block diagram of a logical breakdown of an example OFDM transmitter architecture that might be used to implement some embodiments of the present application.

With reference to FIG. 11, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 11 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 12:
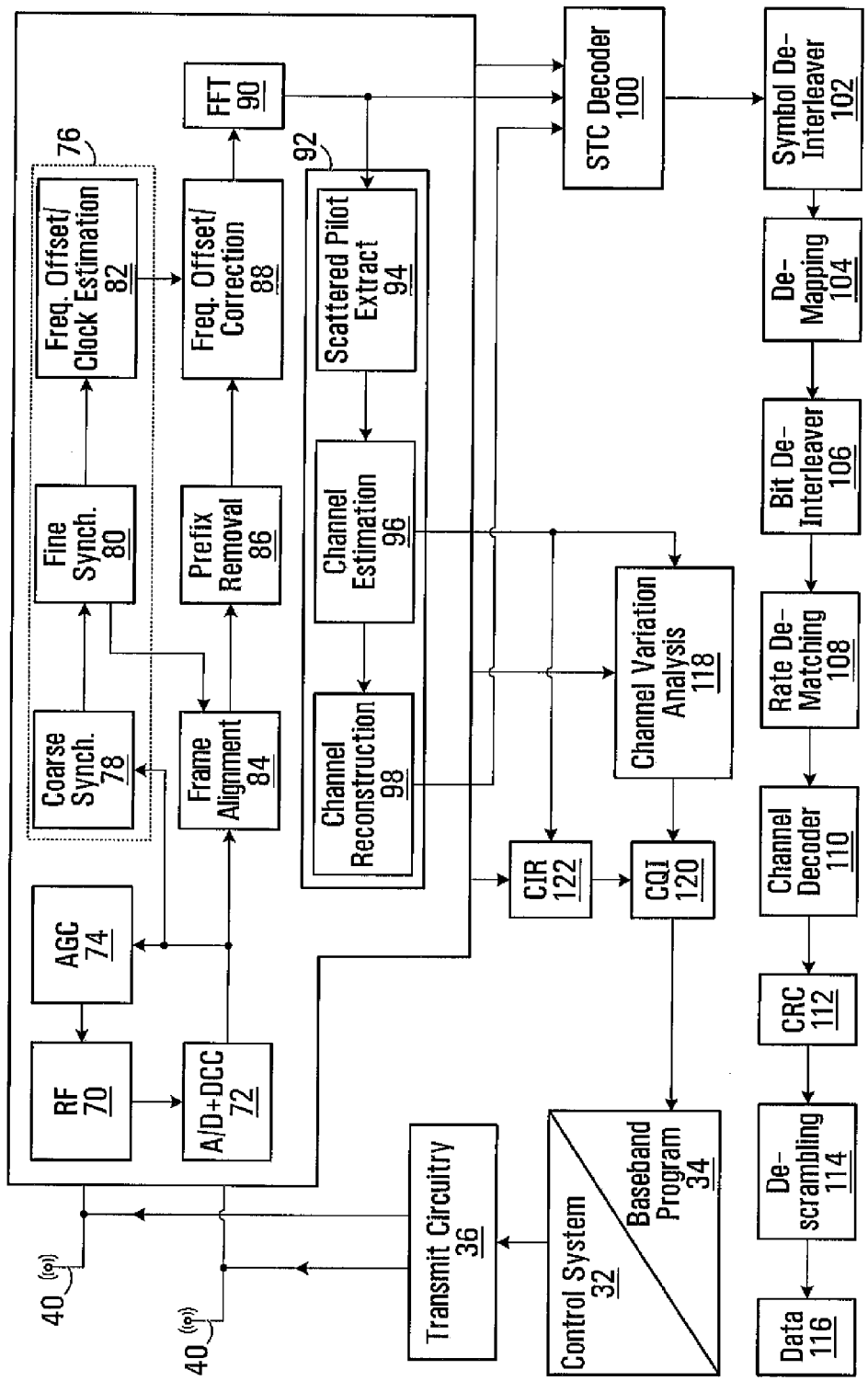
FIG. 12 is a block diagram of a logical breakdown of an example OFDM receiver architecture that might be used to implement some embodiments of the present application.

Reference is now made to FIG. 12 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 12, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI 120, or at least information sufficient to create a CQI at the base station 14, is determined and transmitted to the base station 14. As noted above, the CQI 120 may be a function of the carrier-to-interference ratio (CIR) 122, as well as the degree to which the channel response varies across the various sub-carriers in the OFDM frequency band as determined by the Channel Variation Analysis block 118. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 8 to 12 provide one specific example of a communication system that could be used to implement embodiments of the application. Furthermore, while FIGS. 11 and 12 are described in relation to a transmitting base station and receiving mobile terminal, it should be understood that the transmitting architecture of a mobile terminal, especially a mobile terminal configured with multiple transmit antennas and configured to implement the above described methods, may include signal processing elements of similar type to those described in transmitting architecture FIG. 11. It is to be understood that embodiments of the application can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practised otherwise than as specifically described herein.

The invention claimed is:

1. A method for use in a wireless terminal having a plurality of antennas comprising:
when the wireless terminal is not to implement a transmit diversity scheme based at least in part on at least one of mobility properties of the wireless terminal, location properties of the wireless terminal and statistical properties of a channel between the wireless terminal and a base station, each of the plurality of antennas being assigned a same orthogonal sequence;
when the wireless terminal is to implement the transmit diversity scheme based at least in part on at least one of mobility properties of the wireless terminal, location properties of the wireless terminal and statistical properties of the channel between the wireless terminal and the base station, each antenna of the plurality of antennas being assigned a respective one of a plurality of different orthogonal sequences;
scrambling a signal to be transmitted on a physical uplink control channel (PUCCH) based on the assignment, thereby producing a scrambled PUCCH for transmission by each antenna;
transmitting the scrambled PUCCH on the plurality of antennas; and
if each antenna of the plurality of antennas is assigned a respective one of the plurality of different orthogonal sequences, performing one of:
a) receiving a single orthogonal sequence index for one of the plurality of different orthogonal sequences to configure a first orthogonal sequence that the wireless terminal is to use; and
determining indices of the remaining plurality of different orthogonal sequences as a function of the single orthogonal sequence index, the plurality of different orthogonal sequences being assigned based on the single orthogonal sequence index and determined indices; and
b) receiving an orthogonal sequence index for each orthogonal sequence that the wireless terminal is to use, the plurality of different orthogonal sequences being assigned based on the received orthogonal sequence indices.

2. The method of claim 1 further comprising receiving higher layer signaling for configuring which orthogonal sequences the wireless terminal is to use.

3. The method of claim 1 wherein for a given wireless terminal, a same number of orthogonal sequences are used to scramble a reference signal (RS) as are used to scramble the PUCCH.

4. The method of claim 1 wherein the wireless terminal is serviced by a network configured to support wireless terminals comprising at least two antennas that can perform uplink signaling simultaneously.

5. The method of claim 4 wherein the network is a Long Term Evolution-Advanced (LTE-A) network.

6. The method of claim 1 wherein
the assignment is based on at least one of: PUCCH format 1/1a/1b; and PUCCH format 2/2a/2b.

7. A wireless terminal comprising:
a plurality of antennas;
a receiver coupled to at least one receive antenna of the plurality of antennas;
a transmitter coupled to at least one transmit antenna of the plurality of antennas;
an uplink transmit controller, the uplink transmit controller configured to:
assign at least one orthogonal sequence to a physical uplink control channel (PUCCH) to be transmitted on the at least one transmit antenna;
scramble the PUCCH using at least one of the at least one orthogonal sequence to be transmitted by the transmitter thereby producing a scrambled PUCCH for the at least one transmit antenna;
the transmitter configured to transmit the scrambled PUCCH on the at least one transmit antenna; and
when the wireless terminal is not to implement a transmit diversity scheme based at least in part on at least one of mobility properties of the wireless terminal, location properties of the wireless terminal and statistical properties of a channel between the wireless terminal and a base station, the same orthogonal sequence being assigned to each of the at least one transmit antenna;

when the wireless terminal is to implement the transmit diversity scheme based at least in part on at least one of mobility properties of the wireless terminal, location properties of the wireless terminal and statistical properties of the channel between the wireless terminal and the base station, each antenna of the at least one transmit antenna being assigned a respective one of a plurality of different orthogonal sequences; and if the plurality of different orthogonal sequences are assigned to the wireless terminal, one of:
  a) the receiver being configured to receive a single orthogonal sequence index for one of the plurality of different orthogonal sequences to configure a first orthogonal sequence that the wireless terminal is to use; and
    the uplink transmit controller being further configured to determine indices of the remaining plurality of different orthogonal sequences as a function of the single orthogonal sequence index, the plurality of different orthogonal sequences being assigned based on the single orthogonal sequence index and determined indices; and
  b) the receiver being configured to receive an orthogonal sequence index for each orthogonal sequence that the wireless terminal is to use, the plurality of different orthogonal sequences being assigned based on the received orthogonal sequence indices.

8. The wireless terminal of claim 7 wherein the receiver is further configured to receive higher layer signaling to determine which orthogonal sequences the wireless terminal is to use.

9. The wireless terminal of claim 7 wherein the plurality of antennas is equal to a multiple of two antennas.

10. The wireless terminal of claim 7 wherein the number of transmit antennas and the number of receive antennas is equal, which is equal to the total number of the plurality of antennas.

11. The wireless terminal of claim 7 wherein the wireless terminal is serviced by a network configured to support wireless terminals comprising at least two antennas that can perform uplink signaling simultaneously.

12. The wireless terminal of claim 11 wherein the network is a Long Term Evolution-Advanced (LTE-A) network.

13. A method for use in a base station for configuring a multi-antenna wireless terminal that the base station is configured to support, the method comprising:
  determining whether the wireless terminal is to implement a transmit diversity scheme based at least in part on at least one of mobility properties of the wireless terminal, location properties of the wireless terminal and statistical properties of a channel between the wireless terminal and the base station;
  if the wireless terminal is not to implement the transmit diversity scheme based on the determination, assigning each of a plurality of antennas of the wireless terminal a same orthogonal sequence;
  if the wireless terminal is to implement the transmit diversity scheme based on the determination, assigning each antenna of the plurality of antennas of the wireless terminal a respective one of a plurality of different orthogonal sequences on the basis of one of a single orthogonal sequence indicator and an orthogonal sequence indicator identifying each orthogonal sequence;
  if the wireless terminal is to be assigned the plurality of different orthogonal sequences on the basis of a single orthogonal sequence indicator, the method further includes:
    defining a relation between indices associated with the multiple orthogonal sequences; and
    transmitting a single orthogonal sequence indicator for one of the plurality of orthogonal sequences to configure a first orthogonal sequence that the wireless terminal is to use for transmission; and
  if the wireless terminal is to be assigned the plurality of different orthogonal sequences on the basis of an orthogonal sequence indicator identifying each orthogonal sequence, the method further includes:
    transmitting an orthogonal sequence indicator for each orthogonal sequence that the wireless terminal is to use for transmission.

14. A method for use in a base station for receiving a signal from a multi-antenna wireless terminal that the base station supports, the method comprising:
  receiving at least two signals from each of separate transmit antennas of the multi-antenna wireless terminal, each of the at least two signals comprising a signal that has been transmitted on a physical uplink control channel (PUCCH) that is encoded using at least one orthogonal sequence assigned to a respective transmit antenna of the multi-antenna wireless terminal, the assignment being based at least in part on at least one of mobility properties of the multi-antenna wireless terminal, location properties of the multi-antenna wireless terminal and statistical properties of a channel between the multi-antenna wireless terminal and the base station;
  performing channel estimation;
  combining the at least two signals based at least in part on the channel estimation thereby producing a combined signal;
  decoding the combined signal transmitted on the PUCCH;
  when the at least one assigned orthogonal sequence is not a plurality of different orthogonal sequences, each transmit antenna of the multi-antenna wireless terminal being assigned the same orthogonal sequence; and
  when the at least one assigned orthogonal sequence is the plurality of different orthogonal sequences, each transmit antenna of the multi-antenna wireless terminal being assigned a respective one of the plurality of different orthogonal sequences.

* * * * *